US006755424B1

United States Patent
Paulsen

(10) Patent No.: US 6,755,424 B1
(45) Date of Patent: Jun. 29, 2004

(54) QUICK-CHANGE TOOL ATTACHMENT SYSTEM FOR A RECIPROCATING POWER UNIT

(76) Inventor: Scott A. Paulsen, 4300 River Park Rd., Saukville, WI (US) 53080

( * ) Notice: Subject to any disclaimer, the term of this patent is extended or adjusted under 35 U.S.C. 154(b) by 0 days.

(21) Appl. No.: 10/194,783

(22) Filed: Jul. 12, 2002

(51) Int. Cl.$^7$ ............................................. B23B 31/107
(52) U.S. Cl. ........................... 279/145; 30/392; 30/500; 83/698.71; 279/75
(58) Field of Search ...................... 279/22, 30, 74–75, 279/904, 905, 143–145; 408/226; 15/104.9, 145; 30/500, 392, 393, 394, 339, 337; 81/438, 479; 83/698.71, 699.21, 574, 954

(56) References Cited

U.S. PATENT DOCUMENTS

| | | | |
|---|---|---|---|
| 4,209,182 A | * 6/1980 | Sheldon | 279/75 |
| 4,365,397 A | 12/1982 | Felpel | |
| 4,858,939 A | * 8/1989 | Riggs | 279/75 |
| 4,901,588 A | 2/1990 | Zudal | |
| D333,765 S | 3/1993 | Tomanaha | |
| 5,398,946 A | * 3/1995 | Quiring | 279/30 |
| 5,575,071 A | 11/1996 | Phillips et al. | |
| 5,647,133 A | 7/1997 | Dassoulas | |
| 5,759,093 A | 6/1998 | Rodriguez | |
| 5,794,352 A | 8/1998 | Dassoulas | |
| 5,941,764 A | * 8/1999 | Yang | 279/75 |
| 6,142,715 A | 11/2000 | Fontaine | |
| 6,237,179 B1 | 5/2001 | Balceiro | |
| 6,311,989 B1 | * 11/2001 | Rosanwo | 279/75 |
| 6,561,523 B1 | * 5/2003 | Wienhold | 279/30 |

FOREIGN PATENT DOCUMENTS

WO       WO 01/13802       3/2001

* cited by examiner

*Primary Examiner*—Daniel W. Howell
(74) *Attorney, Agent, or Firm*—Boyle Fredrickson Newholm Stein & Gratz S.C.

(57) ABSTRACT

A mounting arrangement for securing a functional tool to a power unit having a reciprocating output. The mounting arrangement includes an adapter that is engageable with a clamp-type mounting mechanism associated with the output of the power unit. The adapter remains in place in engagement with the power unit, and includes an outer releasable engagement arrangement which is adapted to releasably secure the inner end of a functional tool, such as a file or brush, to the power unit through the adapter. The outer releasable engagement arrangement of the adapter includes a passage within which the inner mounting portion of the functional tool is received. The inner mounting portion of the functional tool further includes a groove, and the releasable engagement arrangement includes a retainer member selectively movably into and out of the groove for maintaining the functional tool in engagement with the adapter and for releasing engagement between the functional tool and the adapter. The outer engagement arrangement is operable without the use of tools, to provide quick and easy engagement of the functional tool with the power unit, and quick and easy removal of the functional tool for replacement by another, differently configured functional tool.

15 Claims, 2 Drawing Sheets

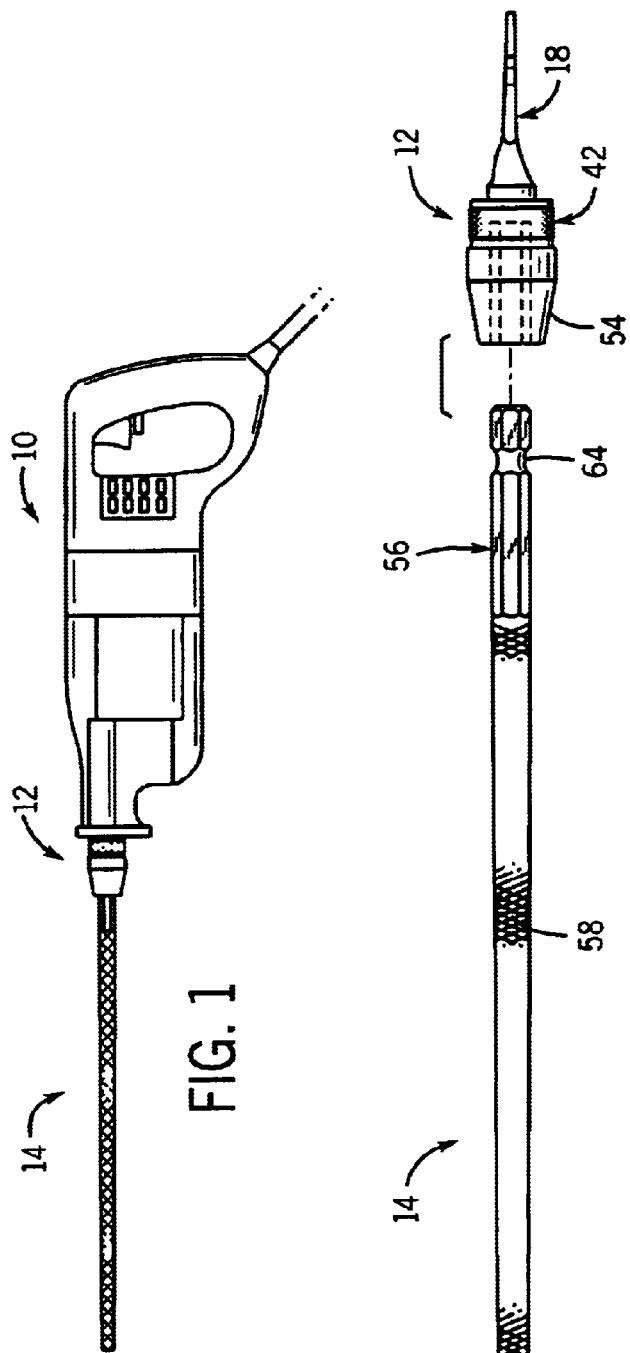

QUICK-CHANGE TOOL ATTACHMENT SYSTEM FOR A RECIPROCATING POWER UNIT

BACKGROUND AND SUMMARY OF THE INVENTION

This invention relates to power tools, and more particularly to a quick-change system for releasably securing a tool to a reciprocating driver or power unit.

A reciprocating power saw typically includes a hand-held power unit or driver which is operable to impart reciprocating motion to a blade attachment arrangement. A conventional saw blade for a reciprocating power saw of this type has a flat inner end formed with a tang and an aperture, which is adapted to be clamped to the blade attachment arrangement to securely retain the blade in place. In this manner, reciprocating motion is imparted to the blade in response to operation of the power unit. The clamp-type blade attachment member requires use of a tool, such as a screwdriver or an alien wrench, to remove and replace the blade.

The reciprocating driving output of a hand-held power unit of this type is suitable for a variety of functions other than the normal sawing function accomplished by use of a saw blade mounted to the unit, including filing, brushing, buffing, etc. In order to accomplish such functions, however, it is necessary to provide appropriate attachments or functional tools that have a specially configured mounting end that is compatible with the clamp-type mounting arrangement member of the power unit. In order to change attachments for different functions, it is necessary to use a tool such as an alien wrench or a screwdriver to remove one type of attachment and replace it with another, to accomplish a different function. This entails a significant amount of time and inconvenience, and requires an operator to always have a tool such as alien wrench or screwdriver at the ready when it is desired to change tools to adapt the power unit for a different function.

It is an object of the present invention to provide a quick-change system for connecting attachments or functional tools to a power unit, without the need for an extra tool such as an allen wrench or a screwdriver in order to remove one attachment or functional tool and replace it with another. It is a further object of the invention to provide such a system which does not entail any modification to the structure of the mounting arrangement of the power unit, while enabling attachments or functional tools of various types to be mounted to the power unit for providing different functions. Yet another object of the invention is to provide such a system which can be readily adapted for use with various types of attachments or functional tools that employ reciprocating action in use. A further object of the invention is to provide such a system which is relatively simple in its components and construction, and which can be easily adapted for use with a conventional power unit having a clamp-type mounting arrangement.

In accordance with the present invention, a mounting system for a hand-held powered driving unit having a clamp-type mounting arrangement, includes an adapter that has an inner end configured to be compatible with the clamp-type mounting arrangement and which is engageable therewith, and an outer attachment of functional tool mounting arrangement which is capable of securing an inner end of a functional tool in a quick-change manner, without the use of a tool such as an allen wrench or a screwdriver. The adapter is secured to the power unit in the same manner as a conventional tool using the clamp-type mounting arrangement of the power unit, and remains in engagement with the power unit. In this manner, the functional tool is engaged with the outer functional tool mounting arrangement of the adapter, to allow quick and easy removal and replacement of one type of functional tool with another.

The outer mounting arrangement of the adapter may have any satisfactory tool-less configuration. In one form, the outer mounting arrangement is in the form of a quick connect chuck-type arrangement having a sleeve defining an axial outwardly-opening passage adapted to receive the inner mounting end of an attachment or functional tool. The passage has an irregular, non-circular cross-section, and the inner mounting end of the functional tool has a matching configuration. The irregular cross-section of the passage and the inner mounting end of the functional tool may be configured to enable the functional tool to be engaged in one of a plurality of predetermined rotational positions.

The outer mounting arrangement of the adapter and the inner mounting end of the functional tool have a tool-less detent or engagement arrangement which is operable to maintain the inner mounting end of the functional tool in engagement within the passage defined by the sleeve. In one form, the engagement arrangement includes a ball which is adapted to be engaged within a groove or the like formed in the inner mounting end of the functional tool when it is received within the passage defined by the sleeve. The outer mounting arrangement may include a slidable collar movable between an engaged position and a release position. The collar is configured to maintain the ball in engagement with the groove when in its engaged position, to secure the functional tool in place within the passage. When in its release position, the collar allows the ball to be moved outwardly relative to the groove, so as to enable the inner mounting end of the functional tool to be withdrawn from the passage defined by the sleeve. In another form, the engagement arrangement may be in the form of a clamping ring which is engaged within a groove associated with the inner mounting end of the functional tool. The outer mounting arrangement includes a tool-less actuator which functions to engage the clamping ring within the groove to maintain the functional tool in engagement within the passage defined by the sleeve, and which can be released so as to withdraw the clamping ring from the groove in the inner end of the functional tool, and to enable the inner end of the functional tool to be removed from the passage defined by the sleeve.

The invention further contemplates an improvement in a power unit having a clamp-type mounting arrangement, for selectively mounting functional tools thereto, as well as a method of interconnecting a functional tool with a power unit, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is an elevation view illustrating a hand-held power unit and a functional tool connected thereto, using an adapter in accordance with the present invention for mounting the functional tool to the power unit in a quick-change, tool-less manner;

FIGS. 2 and 3 are views illustrating different functional tools and the adapter incorporated into the mounting arrangement of the present invention as illustrated in FIG. 1;

DETAILED DESCRIPTION OF THE INVENTION

Figure 4:
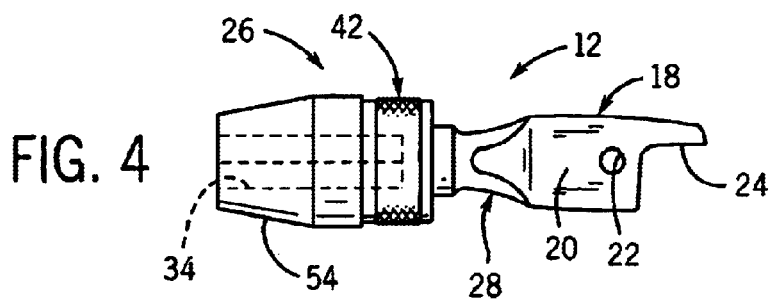
FIGS. 4 and 5 are elevation and plan views, respectively, of the adapter shown in FIGS. 2 and 3 for providing tool-less mounting of functional tools to the power unit.
Figure 5:
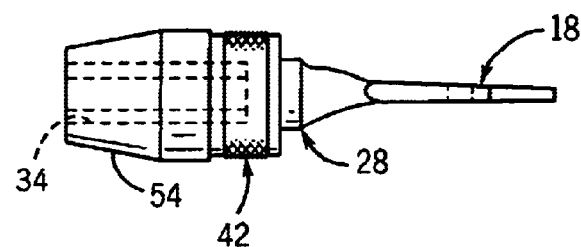

FIG. 1 illustrates a hand-held power unit 10 which provides a reciprocating output, in a manner as is known, and which includes a conventional clamp-type mounting arrangement which is typically adapted to mount a saw blade or the like. Power unit 10 may be of the type available from Milwaukee Electric Tool Company of Milwaukee, Wis. under its designation SAWZALL, although it is understood that any other type of reciprocating power unit may be employed.

In accordance with the present invention, an adapter 12 is engaged with the clamp-type mounting arrangement of power unit 10, for releasably mounting various types of functional tools to power unit 10 in a quick-change or tool-less manner. FIG. 1 illustrates a file 14 mounted to power unit 10 using adapter 12, and FIG. 2 illustrates file 14 separated from adapter 12. FIG. 3 illustrates another type of functional tool capable of being mounted to power unit 10 using adapter 12, in the form of a brush 16.

Adapter 12 includes an inner mounting section 18 adapted for engagement with the clamp-type mounting arrangement of power unit 10. Inner mounting section 18 has the same configuration as is used to secure a conventional saw blade to the clamp-type mounting arrangement of power unit 10, including a flat body section 20 having an aperture 22 and a tang 24 extending therefrom. With this configuration, inner mounting section 18 is engaged with the clamp-type mounting arrangement of power unit 10 using a screwdriver, allen wrench or other similar tool, for operating the mounting arrangement of power unit 10 so as to secure adapter 12 in place.

Adapter 12 further includes an outer mounting arrangement 26 which is adapted to releasably secure a functional tool, such as file 14 or brush 16, to power unit 10. Outer mounting arrangement 26 is manually operated so as to provide tool-less engagement of a functional tool to adapter 12, to provide quick and easy removal and replacement of various types of functional tools.

Adapter 12 includes a central connector section 28, which defines an inner end from which inner mounting section 18 extends, and an outer end to which outer mounting arrangement 26 is connected.

FIGS. 4–7 illustrate a representative construction of outer mounting arrangement 26.

Outer mounting arrangement 26 includes a cylindrical sleeve or inner member 30 having a side wall 32 that defines a passage 34 terminating in an end wall 36. Side wall 32 is configured such that passage 34 has an irregular, non-circular configuration. In the illustrated embodiment, passage 34 is hexagonal in cross-section, although it is understood that any other satisfactory irregular, non-circular shape may be employed. Side wall 32 has one or more openings 38. A ball 40 is disposed within each opening 38, and the diameter of ball 40 is such that ball 40 cannot pass through its associated opening 38.

Outer mounting arrangement 26 further includes an actuator in the form of a collar 42 having a side wall 44 and an annular end wall 46 through which the outer end of connector section 28 extends. Side wall 44 defines a passage within which cylindrical inner member 30 is received. Collar 42 includes a ramped recess 48 within which each ball 40 is received, and defining a ramp surface 49.

Figure 6:
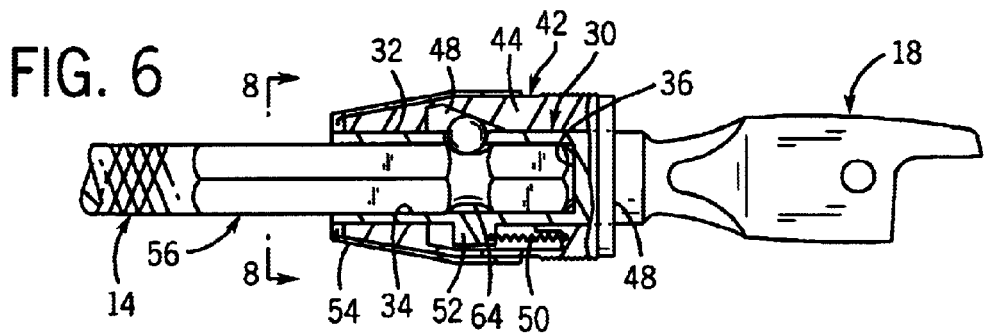
FIG. 6 is a partial section view showing the adapter of FIGS. 4 and 5 and the inner mounting end of a functional tool, such as illustrated in FIGS. 2 and 3, and showing the adapter in an engaged position for maintaining the inner mounting end of the functional tool in engagement with the adapter.
Figure 7:
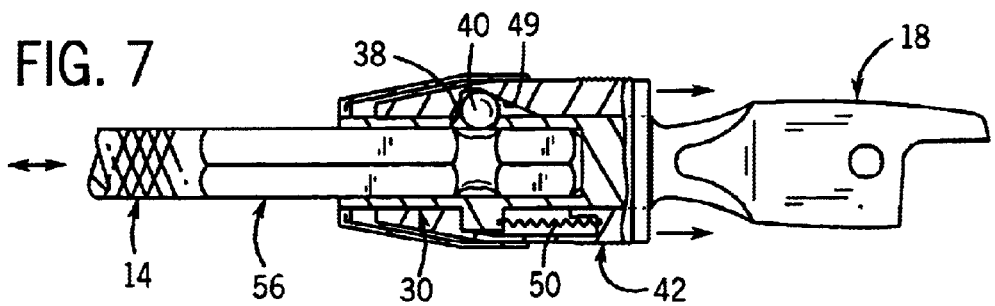
FIG. 7 is a view similar to FIG. 6, showing the adapter in a release position for providing removal or insertion of the inner mounting end of the functional tool in engagement with the adapter.
Figure 8:
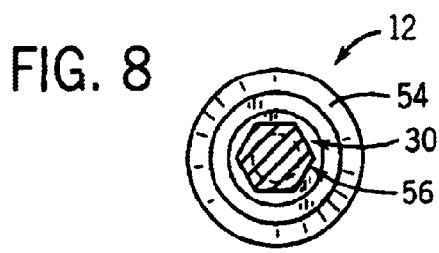
FIG. 8 is a section view taken along line 8—8 of FIG. 6.

A spring 50 is located within a recess defined by side wall 44 of collar 42. At one end, spring 50 is connected to collar 42. At its opposite end, spring 50 is connected to a boss 52 that extends outwardly from side wall 32 of cylindrical inner member 30. Collar 42 is movable between an engaged position as shown in FIG. 6, and a release position as shown in FIG. 7. Spring 50 functions to bias collar 42 outwardly to its engaged position of FIG. 6.

Outer mounting arrangement 26 further includes a shell 54 that is secured to the forward end of cylindrical inner member 30. Shell 54 and the forward portions of collar 42 are shaped so as to be complementary to each other, so that shell 54 defines an internal cavity that receives and engages the forward portions of collar 42 when collar 42 is in its engaged position of FIG. 6.

The inner or rearward end of each functional tool, such as file 14 and brush 16, is in the form of a mounting section 56 which is adapted for releasable engagement with outer mounting arrangement 26 of adapter 12. Each mounting section 56 is identical in construction, and is configured so as to interact with outer mounting arrangement 26, to provide quick-change, tool-less engagement and disengagement of the functional tools, such as file 14 and brush 16, with adapter 12. In the case of file 14, mounting section 56 is secured directly to the inner end of the working surface of file 14, shown at 58. In the case of brush 16, mounting section 56 is connected to the end of an extension 60, which is secured to the base portion of brush 16, shown at 62.

Mounting section 56 has a cross-section which matches that of passage 34 defined by cylindrical inner member 30, and includes an annular groove 64. In the illustrated embodiment, mounting section 56 is hexagonal, to correspond with the shape of passage 34. With this arrangement, the functional tool, such as file 14 or bush 16 can be employed with outer mounting arrangement 26 in one of several predetermined angular positions. It is understood, however, that passage 34 and mounting section 56 may have any other non-circular matching configuration.

In operation, adapter 12 functions as follows to provide releasable engagement of various types of functional tools, such as file 14 and brush 16, with power unit 10. Initially, the user secures inner mounting section 18 of adapter 12 to the clamp-type mounting mechanism of power unit 10 using an alien wrench, screwdriver or the like, in a manner as is known. Adapter 12 then remains in engagement with the clamp-type mounting mechanism of power unit 10, and the user utilizes outer mounting arrangement 26 of adapter 12 so as to releasably secure various types of functional tools to power unit 10. To do so, the user manually engages collar 42 and applies a rearward axial force on collar 42, to place collar 42 in its release position of FIG. 7. The user then inserts mounting section 56 of a desired functional tool, such as file 14 or brush 16, into passage 34 defined by side wall 32 of cylindrical inner member 30. Using the irregular cross-section of mounting section 56 and passage 34, the user engages the functional tool with power unit 10 in a desired rotational position. In the case of a functional tool such as file 14, the rotational position of the functional tool relative to power unit 10 is not important, except to ensure that the working surface 58 of file 14 is evenly used. In the case of a functional tool such as brush 16, which has a discrete, defined direction of orientation of its working components, e.g. the bristles 66 of brush 16, the functional tool is positioned so as to ensure that the working component of the tool faces in a desired direction. In this manner, the user can manually grip and use power unit 10 in the intended manner, while the functional tool can be positioned to operate in any desired direction during use.

After the functional tool, such as file 14 or brush 16, has been positioned as desired and its inner mounting section 56 inserted into passage 34 such that the end of mounting section 56 engages end wall 36, the user releases engagement of collar 42. This results in forward movement of collar 42 to its engaged position as shown in FIG. 6 under the influence of spring 50. Upon such forward movement of collar 42, ramp surface 49 of each ramp recess 48 is operable to force its associated ball 40 inwardly into engagement with groove 64 in mounting section 56. Such engagement of the one or more balls 40 within the groove 64 of mounting section 56 functions to releasably engage the functional tool with adapter 12, to enable operation of power unit 10 and to provide reciprocating movement of the functional tool so as to accomplish the desired task. Engagement of ball 40 within groove 64 functions to maintain the functional tool in position relative to adapter 12 during operation of power unit 10.

When it is desired to remove the functional tool, either for replacement with another functional tool or for storage, the user again applies an axial rearward force to collar 42, to return collar 42 to its disengaged position of FIG. 7. Mounting section 56 can then be withdrawn from passage 34. The arcuate configuration of groove 64 functions to move each ball 40 outwardly into the outer area of each ramp recess 48, which moves balls 40 out of the path of the inner end of mounting section 56, to enable mounting section 56 to be withdrawn.

When it is desired to use other types of attachments for power unit 10, such as conventional saw blades or the like, adapter 12 is removed using a screwdriver, alien wrench or the like, and the user engages the inner mounting end of the attachment with the clamp-type mounting arrangement of power unit 10 in a conventional manner.

It can thus be appreciated that adapter 12 provides an easily operated arrangement for quickly and easily engaging and disengaging a functional tool to and from power unit 10.

While the invention has been shown and described with respect to a specific embodiment, it is understood that numerous variations are possible and are contemplated as being within the scope of the present invention. For example, and without limitation, the inner mounting section of adapter 12 may be adapted to interact with any type of tool operated mounting arrangement, using a clamp mechanism or any other type of mechanism, for securing adapter 12 in place to the movable output member of the power unit. In addition, while passage 34 and mounting section 56 are shown and described as having a matching hexagonal shape, it is understood that any other type of non-circular shape may be employed. The configuration may be such as to enable the working surface of the functional tool to be placed in a number of positions, or may be configured to position the tool in a single position. Further, it is understood that the ball-type engagement mechanism as shown and described may be replaced with any other type of releasable engagement arrangement which does not require tools for use. Examples include a twist-type chuck arrangement such as is commonly employed to secure a drill bit to a drill, modified to include a split ring or the like which is adapted for engagement within a groove formed in the inner end of the functional tool mounting section. In a case such as this, groove 64 with its arcuate surfaces is replaced with a groove having sharp sides, to receive the split ring when the outer mounting arrangement is tightened onto the tool. An axial motion actuator such as shown and described may also be used, and the balls 40 replaced with outwardly biased ring sections that are received within the groove in the inner mounting section of the tool. Various other types of tool-less engagement arrangements may be employed. In addition, while the functional tools are illustrated as file 14 and brush 16, it is understood that virtually any type of reciprocating attachment may be secured to power unit 10 using adapter 12, including but not limited to __, __, __, __, etc.

Various alternatives and embodiments are contemplated as being within the scope of the following claims particularly pointing out and distinctly claiming the subject matter regarded as the invention.

I claim:

1. A power tool, comprising:
    a hand-held power unit having an axially reciprocating movable output arrangement that includes a clamp-type mounting arrangement;
    an adapter having a generally flat first connector section that is adapted for engagement with the clamp-type mounting arrangement of the movable output arrangement, and a second connector section having a releasable engagement arrangement; and
    a functional tool having an inner mounting portion, wherein the inner mounting portion of the functional tool and the releasable engagement arrangement of the second connector section of the adapter are configured and arranged so as to provide engagement of the inner mounting portion of the functional tool with the releasable engagement arrangement without the use of tools, wherein the inner mounting portion of the functional tool is engaged with the releasable engagement arrangement of the second connector section via application of a push-on force to the inner mounting portion of the functional tool in a direction parallel to the direction of movement of the axially reciprocating movable output arrangement of the power unit.

2. In a power tool including a hand-held power unit having an axially reciprocating output arrangement with a clamp-type mounting arrangement, the improvement comprising an adapter having a generally flat inner end secured to the power unit using the clamp-type mounting arrangement, and an outer end having a manually operable functional tool mounting arrangement for releasably securing an inner mounting portion of a functional tool to the adapter, wherein the inner mounting portion of the functional tool and the manually operable functional tool mounting arrangement are configured such that the inner end of the functional tool is engaged with the tool mounting arrangement via a push-on force that is parallel to the direction of movement of the direction of movement of the axially reciprocating output arrangement of the power tool.

3. The power tool of claim 1, wherein the inner mounting portion of the functional tool and the releasable engagement arrangement have matching non-circular cross sections which prevent rotation of the functional tool relative to the adapter.

4. The power tool of claim 3, wherein the inner mounting portion of the functional tool includes a groove, and wherein the releasable engagement arrangement includes a retainer member selectively movable into engagement with the groove in response to a manually operable actuator member associated with the releasable engagement arrangement.

5. The power tool of claim 4, wherein the retainer member is movable radially inwardly and outwardly into and out of engagement with the groove in the inner mounting portion of the functional tool, in response to movement of the actuator member between an engaged position and a release position.

6. A The improvement of claim 2, wherein the functional tool mounting arrangement includes an actuator and a radially movable retainer member adapted for movement into and out of a groove associated with the inner mounting portion of the functional tool, in response to movement of the actuator between an engaged position and a release position.

7. A method of connecting a functional tool to a power unit having an axially reciprocating movable output arrangement with a clamp-type mounting arrangement, comprising the steps of:

securing an adapter to the movable output arrangement of the power unit, wherein the adapter is engaged with the movable output arrangement of the power unit by a first connection arrangement that includes a generally flat mounting section engaged with the clamp-type mounting arrangement of the movable output arrangement; and releasably engaging a functional tool with the adapter by means of a second engagement arrangement configured to provide tool-less engagement and disengagement of the functional tool to and from the adapter, wherein the functional tool includes an inner mounting portion, and wherein the inner mounting portion of the functional tool is engaged with the second engagement arrangement of the adapter via application of a push-on force to the inner mounting portion of the functional tool in a direction parallel to the direction of movement of the axially reciprocating movable output arrangement of the power unit.

8. The method of claim 7, wherein the step of securing the generally flat mounting section of the adapter to the clamp-type mounting arrangement of the movable output arrangement of the power unit is carried out by use of a tool so that the adapter is retained in engagement with the movable output arrangement.

9. The method of claim 7, wherein the step of releasably engaging the functional tool with the adapter is carried out by releasably securing the inner mounting portion of the functional tool to a manually operable connection arrangement associated with the second engagement arrangement of the adapter.

10. The method of claim 9, wherein the manually operable connection arrangement includes an actuator member which is movable between an engaged position and a release position, and wherein the engagement arrangement further includes a retainer member selectively engageable within a groove associated with the inner mounting portion in response to movement of the actuator member between its engaged position and its release position.

11. The method of claim 10, further comprising the step of securing the functional tool to the adapter in a predetermined angular position.

12. The method of claim 11, wherein the step of securing the functional tool to the adapter in a predetermined angular position is carried out by providing the releasable connection arrangement with a non-circular passage, and providing the inner mounting portion of the functional tool with a matching non-circular cross-section which is engageable within the passage in one of a plurality of selected positions, to enable the rotational position of the functional tool to be varied relative to a longitudinal axis defined by the inner mounting portion.

13. The improvement of claim 6, wherein the functional tool mounting arrangement includes a passage and wherein the retainer member is adapted to selectively move radially inwardly and outwardly relative to the passage.

14. The improvement of claim 13, wherein the passage has a non-circular cross-section, and wherein the inner mounting portion of the functional tool includes a matching non-circular cross-section for engaging the functional tool with the adapter in a predetermined orientation relative to the power unit.

15. The improvement of claim 14, wherein the matching non-circular configuration of the passage and the inner mounting portion enable the functional tool to be engaged with the adapter in a plurality of different positions.

* * * * *